Patented Nov. 20, 1934

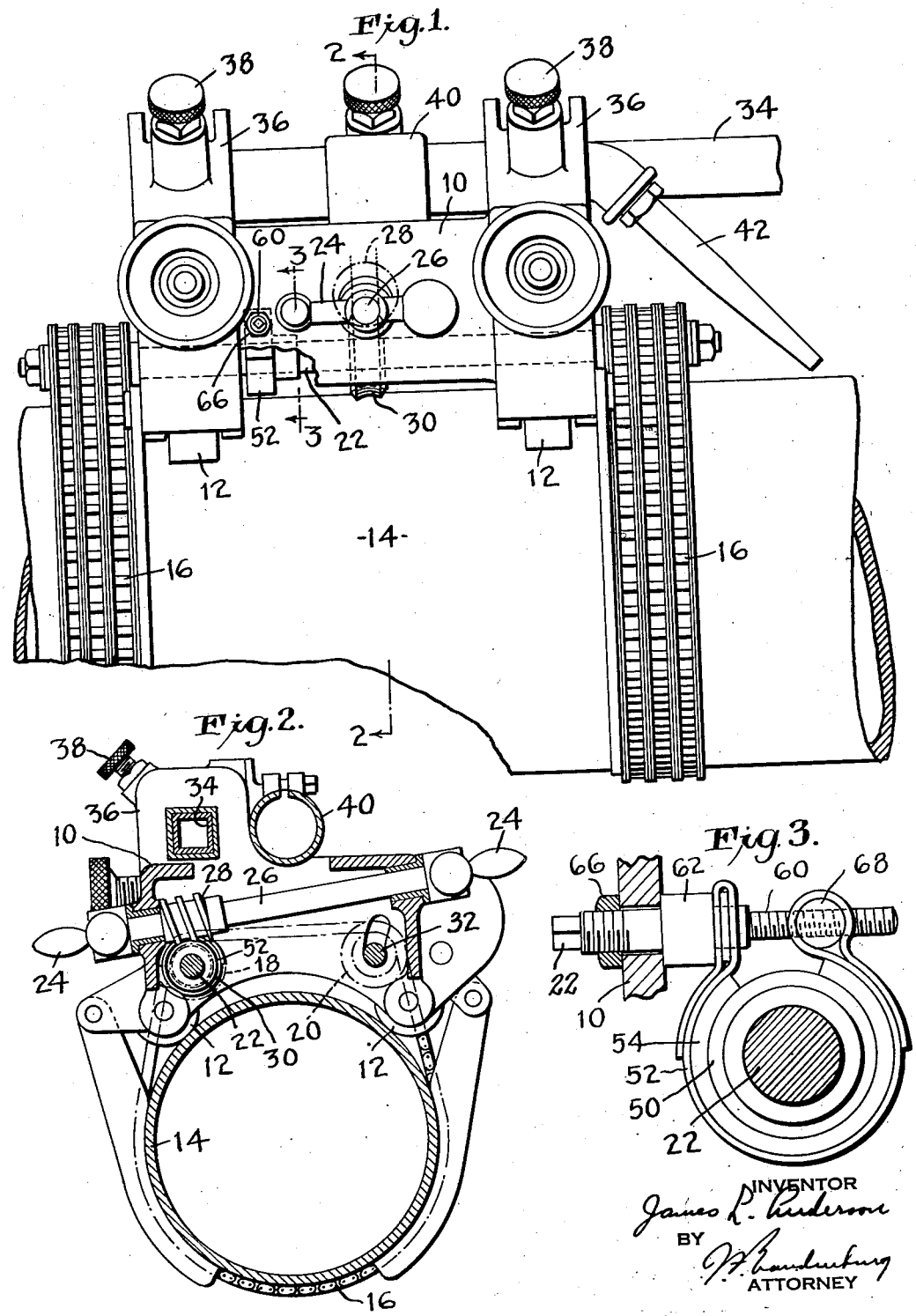

1,981,341

UNITED STATES PATENT OFFICE 1,981,341

CIRCUMFERENTIAL PIPE CUTTING OR WELDING MACHINE

James L. Anderson, Closter, N. J., assignor to Air Reduction Company, Incorporated, New York, N. Y., a corporation of New York Application July 1, 1933, Serial No. 678,609

9 Claims. (Cl. 266—23)

This invention relates to circumferential pipe cutting or welding machines of the type having a torch carriage movable on and around the surface of a pipe and held against the pipe by a sprocket chain or other flexible member which passes around the pipe and over the carriage. A machine of this kind is shown in my copending application Serial No. 628,664, filed August 13, 1932.

When operating such machines, the relative movement of the carriage and pipe can be caused by moving the carriage, or turning the pipe with respect to the carriage, or both. The carriage is ordinarily equipped with a mechanical driving mechanism, and it is mportant that the driving mechanism move the carriage over the pipe surface at a substantially uniform speed in order to obtain a smooth cut or weld.

As the carriage moves around the pipe it encounters variable resistance. When the relative movement is caused by turning the pipe with the carriage stationary, uneven surface of the pipe or differences in the curvature cause variations in the resistance to the relative movement of the carriage and pipe. The greatest variations, however, are encountered when the carriage is moved around a stationary pipe. The weight of the carriage is an important factor in such operation, and adds greatly to the force required to move the carriage when climbing up the side of the pipe. When the carriage is going down the other side of the pipe, its weight is usually more than enough to overcome the resistance to the carriage movement, and the driving mechanism must be used to hold the carriage back and keep the speed down to the proper rate for the cutting or welding torch.

There is some lost motion in the driving mechanism of a circumferential pipe cutting or welding machine, and this lost motion tends to increase somewhat with continued use of the machine. Variations in the resistance encountered by the carriage often cause the lost motion to be taken up first in one direction and then in the other so that the speed of the carriage is not uniform. This results in an uneven cut or weld, and sometimes leaves an uncut portion along the path of a cutting torch.

This invention has for its object to provide an improved circumferential pipe cutting or welding machine of the type having a flexible member holding it against the pipe, and comprises novel features and combinations of elements that reduce the variations in the resistance to the relative movement of the carriage and pipe and make the carriage move uniformly at all times at the speed determined by the driving mechanism regardless of lost motion in the driving mechanism.

Other objects, features and advantages of the invention will appear or be pointed out as the description proceeds.

In the accompanying drawing, forming a part hereof:

Fig. 1 is a side elevation, partly broken away, show.ng a circumferential pipe cutting or welding machine embodying the invention, the machine being shown in position on a pipe:

Fig. 2 is a reduced sectional view on the line 2—2 of Fig. 1, with the torch removed; and Fig. 3 is an enlarged sectional view on the line 3—3 of Fig. 1.

A torch carriage having a frame 10 is supported by rollers or wheels 12 which contact with the outside surface of a pipe 14. The carriage is held against the pipe by flexible members, as sprocket chains 16, each of which passes around the pipe and over sprockets 18 and 20 (Fig. 2) supported by the carriage.

The sprocket 18 is secured to a drive shaft 22, which is operated to rotate the sprocket 18 and move the carriage around the pipe.

The drive shaft 22 is operated by handles 24 on opposite ends of a shaft 26 carrying a worm gear 28 which meshes with a worm wheel 30 on the drive shaft 22.

The sprocket 20 is an idler and is supported by a shaft 32, which is movable away from the pipe 14 to control the tension of the sprocket chains. Means for thus tensioning the sprocket chains are described in said copending application Serial No. 628,664.

A bar 34 fits within brackets 36 and is clamped in these brackets by screws 38. The purpose of this bar is to support a torch at some distance from the carriage. A clamp 40 is used to hold a torch 42 (Fig. 1) for cutting or welding close to the carriage.

When the carriage is moving up one side of the pipe, it is necessary to transmit enough force through the worm drive to overcome the resistance added by the weight of the carriage. As the carriage reaches the top of the pipe the force necessary to drive it decreases rapidly and when the carriage begins to go down on the other side of the pipe the weight of the carriage becomes an aid instead of a resistance to its movement. Some time in its travel across the top of the pipe, the play or lost motion in the worm drive will permit the carriage to move a short distance independently of the operating handles unless some precaution is taken to prevent such movement.

If there is substantial lost motion in the worm drive, the carriage may move far enough to leave a part of the pipe uncut or not satisfactorily welded, and even a slight movement ahead of the driving mechanism causes a rough place in the cut or weld.

By putting a brake on the drive shaft 22 with sufficient resistance to require the transmission of some force through the worm drive mechanism at all times, even when the carriage is going down the pipe, any lost motion in the driving means can always be taken up in the same direction so that it has no effect on the movement of the machine. Such a brake is shown operating on the drive shaft 22.

A collar 50 is rigid with the drive shaft 22. A brake band 52, best shown in Fig. 3, has a brake lining 54 in contact with the collar 50. The friction of the brake is controlled by a screw 60 having a collar 62 near its mid-portion and a square head 64 for receiving a handle or wrench. The screw 60 extends through one side of the frame 10. The collar 62 abuts against the frame 10, and a nut 66 is threaded on the end of the screw 60 and clamped against the frame 10 to keep the screw 60 from turning. The nut 66 is backed away from the frame 10 when the screw 60 is to be turned to change the friction of the brake.

One end of the brake band 52 is anchored to the screw 60 against one side of the collar 62, and the other end of the brake band is looped around a cylindrical nut 68 which is threaded on the screw 60. Turning the screw 60 to the right draws the nut 68 toward the collar 62 and tightens the brake band around the drum so that the friction of the brake is increased. Turning the screw 60 to the left moves the nut 68 away from the collar 62 and loosens the brake. There is enough resilience in the brake band and lining so that the friction changes are gradual as the screw 60 is turned one way or the other to regulate the friction load on the shaft. The friction of the brake should be great enough to hold the carriage back when descending the steepest part of the pipe, and slightly more friction than this is necessary for a factor of safety. Any greater friction than necessary increases the work of operating the machine and serves no useful purpose.

The preferred embodiment of the invention has been described, but it can be changed or modified without departing from the invention as defined in the claims.

I claim:

1. A circumferential pipe cutting or welding machine, comprising a torch carriage, wheels supporting the torch carriage to travel on and around the surface of the pipe, means comprising a flexible element adapted to be passed about the pipe and in engagement with the carriage so as to hold the carriage to the pipe, drive mechanism on the carriage for producing relative circumferential feed between the carriage and the pipe, and a friction brake resisting the operation of said drive mechanism.

2. A circumferential pipe cutting or welding machine, comprising a torch carriage adapted to travel on and around the surface of the pipe, means comprising a flexible element adapted to be passed around the pipe and in engagement with the carriage so as to hold the carriage thereto, driving means on the carriage coacting with the flexible element to produce relative circumferential feed between the carriage and the pipe, and a friction brake resisting the operation of the driving means.

3. A circumferential pipe cutting or welding machine, comprising a torch carriage having rolling supports to bear stably on the surface of the pipe, a sprocket wheel on the carriage, a friction brake resisting rotation of the sprocket wheel, a worm wheel connected with the sprocket wheel, a driving worm engaging the worm wheel, and a sprocket chain adapted to be passed about the sprocket wheel and the pipe.

4. A circumferential pipe cutting or welding machine, comprising a torch carriage adapted to travel on and around the surface of the pipe, a flexible element adapted to be passed about the pipe and a portion of the carriage to hold the carriage to the pipe, driving means on the carriage for producing relative circumferential movement of the carriage and the pipe, and friction brake means for resisting said relative movement of the pipe and carriage.

5. A circumferential pipe cutting or welding apparatus, comprising a stable carriage bearing a torch, a flexible member for holding the carriage to a round body, wheels rolling on the body and supporting the carriage, a rotary member supported by the carriage and rolling on the flexible member, and a friction brake resisting the rotation of said rotary member.

6. A circumferential pipe cutting or welding machine including a torch carriage, a flexible element for surrounding the pipe to hold the carriage against the pipe, a member on the carriage over which the flexible element passes, wheels supporting the carriage for movement on and around the surface of the pipe, and friction brake means resisting such movement of the carriage.

7. A circumferential pipe cutting or welding machine, comprising a torch carriage having rolling supports to bear stably on the surface of the pipe, a sprocket wheel on the carriage, a friction brake resisting rotation of the sprocket wheel, and a sprocket chain adapted to be passed about the sprocket wheel and about the pipe so as to hold the carriage to the pipe.

8. A torch apparatus for cutting or welding pipe, comprising a torch carriage, a sling around the pipe and carriage for holding and guiding the carriage on the pipe, wheels supporting the carriage on the pipe, a guide member on the carriage, the sling passing over and contacting with the guide member to hold the carriage on the pipe, and friction brake means resisting relative movement of the carriage and the pipe.

9. A pipe cutting or welding machine including a torch carriage, rollers on the carriage for supporting it stably on the surface of a pipe, a flexible member for passing around the pipe and over the carriage to hold the carriage rollers against the pipe, a driving wheel on the carriage engaging the under side of the flexible member, an idler wheel on the carriage engaging the under side of the flexible member, and a friction brake for resisting the rotation of one of said wheels.

JAMES L. ANDERSON.